(12) United States Patent
Duvvuru

(10) Patent No.: US 8,775,742 B2
(45) Date of Patent: Jul. 8, 2014

(54) SYSTEM AND METHOD FOR CACHE MANAGEMENT IN A DIF ENABLED STORAGE SYSTEM

(75) Inventor: Venkata Kumar Duvvuru, Nellore (IN)

(73) Assignee: LSI Corporation, Milpitas, CA (US)

( * ) Notice: Subject to any disclaimer, the term of this patent is extended or adjusted under 35 U.S.C. 154(b) by 621 days.

(21) Appl. No.: 12/862,798

(22) Filed: Aug. 25, 2010

(65) Prior Publication Data

US 2012/0054436 A1    Mar. 1, 2012

(51) Int. Cl.
*G06F 13/00*    (2006.01)

(52) U.S. Cl.
USPC ................. 711/137; 711/E12.057

(58) Field of Classification Search
None
See application file for complete search history.

(56) References Cited

U.S. PATENT DOCUMENTS

| | | | |
|---|---|---|---|
| 5,652,858 A * | 7/1997 | Okada et al. | 711/137 |
| 6,092,154 A * | 7/2000 | Curtis et al. | 711/137 |
| 7,386,674 B1 * | 6/2008 | Lango | 711/137 |
| 2004/0107318 A1 * | 6/2004 | Bono et al. | 711/118 |
| 2005/0105493 A1 * | 5/2005 | Rai et al. | 370/335 |
| 2009/0049272 A1 * | 2/2009 | Brunheroto et al. | 711/207 |
| 2010/0042786 A1 * | 2/2010 | Bell et al. | 711/121 |
| 2010/0191910 A1 * | 7/2010 | Gates et al. | 711/118 |

* cited by examiner

*Primary Examiner* — Sean D Rossiter
(74) *Attorney, Agent, or Firm* — Prakash Nama; Global IP Services, PLLC

(57) ABSTRACT

A system and method for caching file data is disclosed. In one embodiment, in a method for caching file data stored in a storage device, wherein the file data is used by an application running on a computing system having a processor, a file system residing in memory, and a storage controller, file data required by the application running on the processor is determined and file access data is generated. Then, physical file mapping information related to the file access data on the storage device is determined. The physical file mapping information includes logical block information, associated physical block information, and a next block hint needed for caching portions of the file data for each subsequent logical block. Further, read commands are generated from the storage controller to read-ahead file data stored in the storage device using the physical file mapping information.

20 Claims, 4 Drawing Sheets

SYSTEM AND METHOD FOR CACHE MANAGEMENT IN A DIF ENABLED STORAGE SYSTEM

BACKGROUND

Typically, in storage technologies, read-ahead algorithms are employed by storage controllers to read file data and store in a cache which has a higher probability of being read by an application. For example, reading a next set of physical blocks in a sequential file read operation. Typically, these read-ahead algorithms have limited interaction with the applications and file systems which include details of how a logical unit of files is spread across a storage device. Further, the storage controllers using the read-ahead algorithms may not be capable of detecting and reading metadata associated with needed read-ahead physical blocks for caching.

Therefore, the existing read-ahead algorithms may be only effective where large amounts of file data are contiguously stored within a storage device. However, in a typical read scenario, an application may have to read blocks of file data that are stored non-contiguously within the storage device. In such a scenario, using the existing read-ahead algorithms can result in significant cache misses and data delivery latencies as the next block of file data may not be stored in next storage area of the storage device.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for cache management in a DIF enabled storage system is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
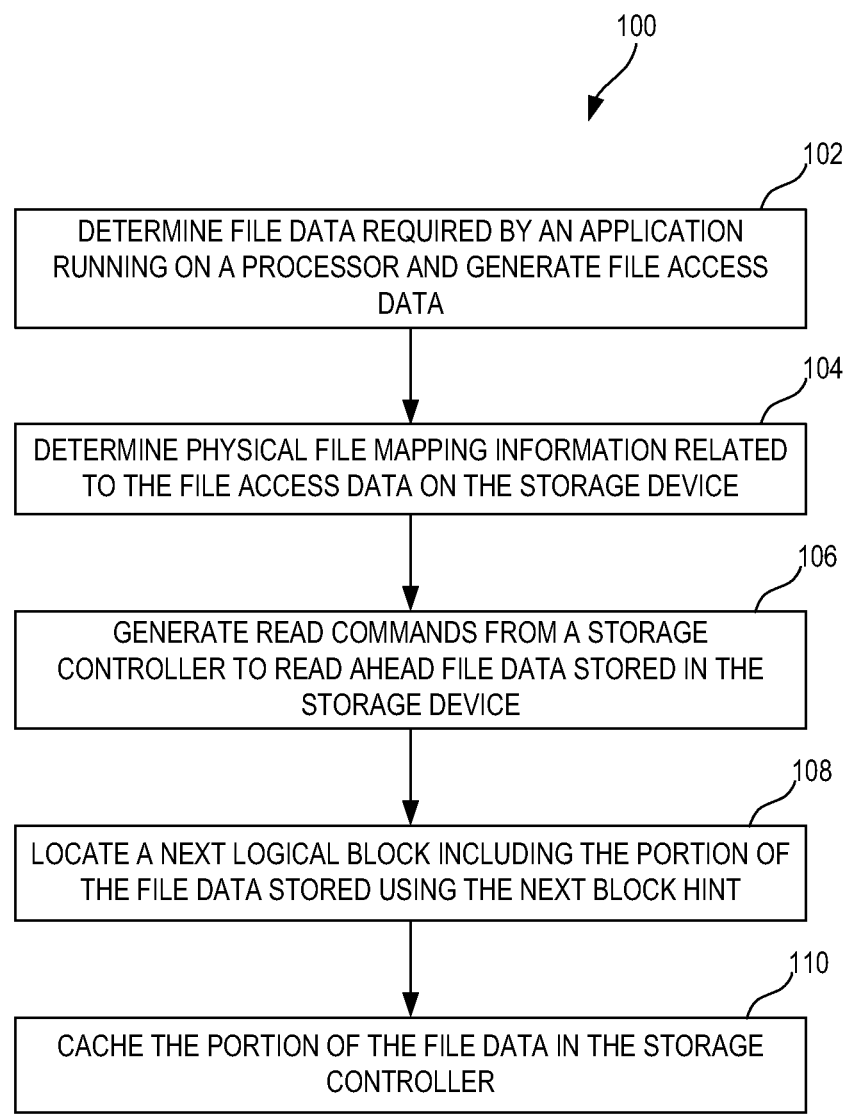
FIG. 1 illustrates a flow diagram of a method for caching file data in a data integrity field (DIF) enabled storage system, according to one embodiment.

FIG. 1 illustrates a flow diagram of a method 100 for caching file data in a data integrity field (DIF) enabled storage system, according to one embodiment. In one embodiment, the file data is used by an application running on a computing system (e.g., the computing system 402 of FIG. 4) having a processor, a file system residing in memory and a storage controller. The storage controller may be a small computer system interface (SCSI) controller or a serial attached SCSI (SAS) controller. In one embodiment, the storage controller and the storage device are DIF enabled storage controller and DIF enabled storage device respectively. For example, the DIF is an extension to SCSI protocol. The DIF may be a T10-DIF, where T10 is international committee for informational technology standards (INCITS) body responsible for SCSI family of protocols.

At step 102, the file data required by the application running on the processor is determined and file access data is generated. At step 104, physical file mapping information related to the file access data on the storage device is determined. The physical file mapping information may include logical block information, associated physical block information, and a next block hint needed for caching portions of the file data for each subsequent logical block. For example, the next block hint includes next logical block's physical address and is generated in the file system.

At step 106, read commands are generated from the storage controller to read-ahead file data stored in the storage device using the logical block information, associated physical block information and the next block hint needed for caching portions of the file data for each subsequent logical block. For example, the read commands may be SCSI read commands or SAS read commands. At step 108, a next logical block including the portion of the file data stored is located using the next block hint. At step 110, the portion of the file data is cached in the storage controller. In one embodiment, the steps of locating and caching are repeated until a threshold associated with the storage controller is reached.

Figure 2:
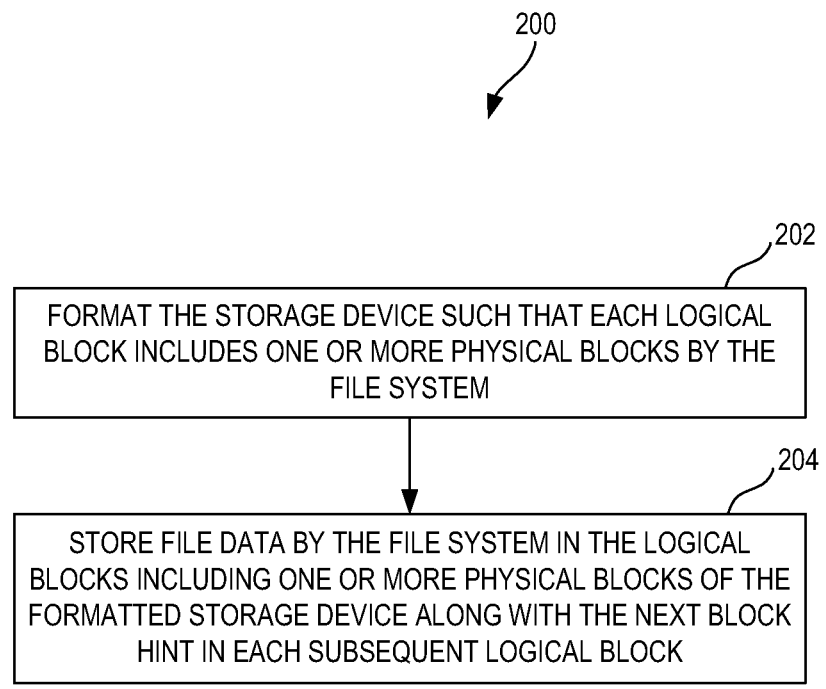
FIG. 2 illustrates a flow diagram of a method for storing a next block hint in logical blocks of a storage device for caching the file data, according to one embodiment.

FIG. 2 illustrates a flow diagram of a method 200 for storing a next block hint in logical blocks of a storage device (e.g., the storage device 416 of FIG. 4) for caching file data, according to one embodiment. At step 202, the storage device is formatted by the file system (e.g., the file system 410 of FIG. 4) such that each logical block includes one or more physical blocks (e.g., the physical blocks 420A-N of FIG. 4). Each physical block includes multiple bytes (e.g., 2 bytes) for storing the next block hint. At step 204, the file data is stored by the file system in the logical blocks including one or more physical blocks of the formatted storage device along with the next block hint in each subsequent logical block using the determined physical file mapping information related to the file access data on the storage device.

For example, the next block hint may be stored in an application tag (e.g., the application tag 304 of FIG. 3) in a DIF of a previous logical block. Once the file data is stored in a current logical block, physical address of the current logical block (i.e., the next block hint) is stored in the application tag of the previous logical block. Then, a write command is issued to the storage controller for writing the previous logical block including the application tag with the next block hint. When the storage controller reads file data from the previous logical block, the next block hint is also read. The storage controller may then read-ahead file data looking at a next logically sequential logical block which has a very high probability of being read by the application in case of sequential file reads. This helps increase in probability for cache hits. It should be noted that, the read-ahead performance of a storage system may vary depending on whether the reads are random or sequential.

Figure 3:
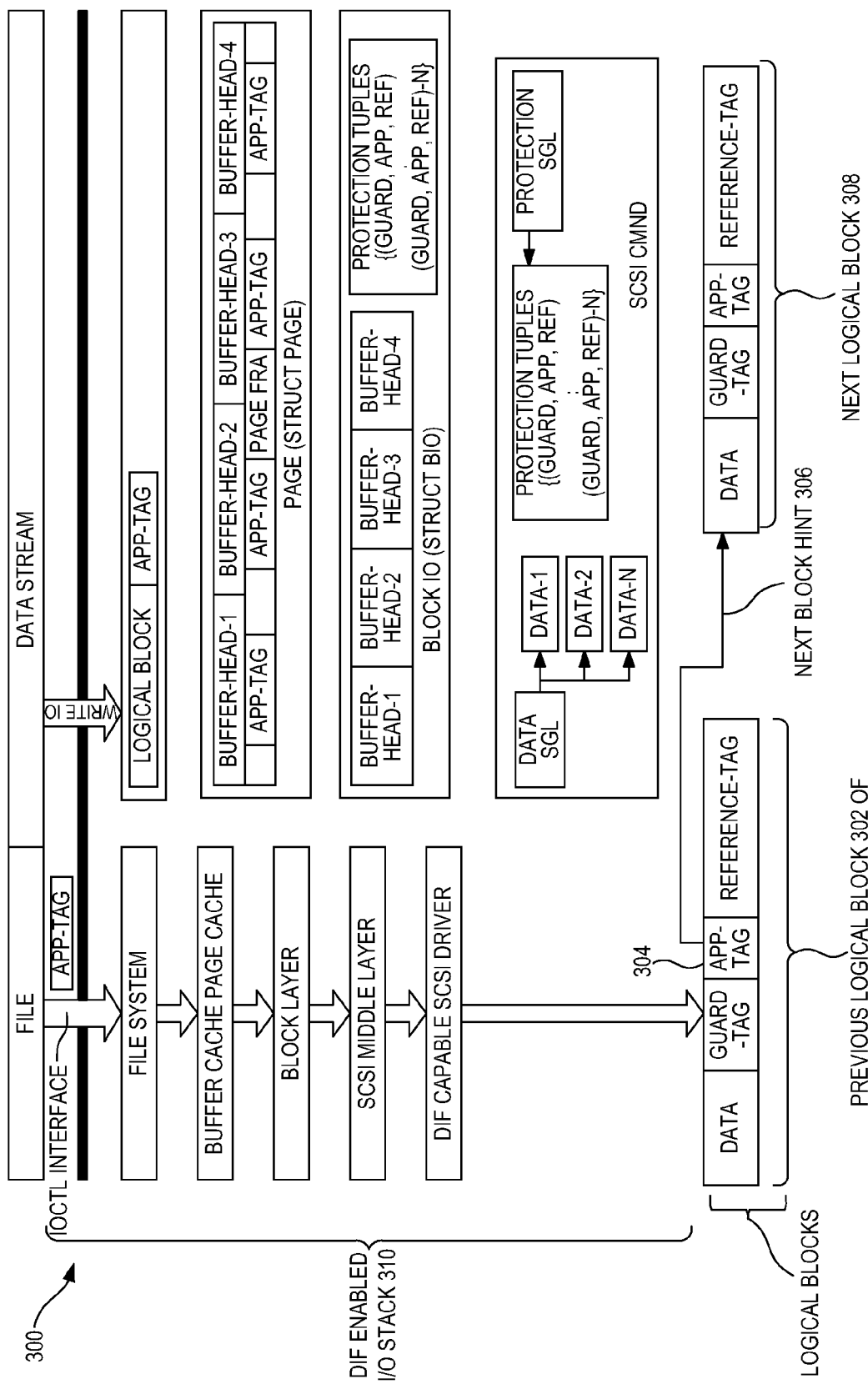
FIG. 3 illustrates a block diagram of a logical block including the next block hint in an application tag, according to one embodiment.

FIG. 3 illustrates a block diagram 300 of a logical block 302 including a next block hint 306 in an application tag 304, according one embodiment. In particular, FIG. 3 illustrates data integrity extensions (DIX) architecture of Oracle Linux.

The architecture shows a DIF enabled input/output (I/O) stack 310, an application, and a storage controller. As described in FIG. 2, the file system generates and stores a next block hint in a previous logical block. The next block hint 306 is stored in the application tag 304 of a previous logical block 302, as shown in FIG. 3. In one embodiment, the file system formats the storage device such that two bytes of the previous logical block 302 are coalesced to store the next block hint 306.

For example, consider a 20 sectored storage device formatted with a file system of logical block size 2 Kilobytes (K). Thus, the storage device includes 5 (0-4) logical blocks of size 2K and 20 (0-19) physical blocks of 512 bytes. The logical block 0 starts from physical block 0, logical block 2 starts from physical block 4, logical block 3 starts from physical block 8, and so on. Each of the 20 physical blocks has 2 bytes for storing the next block hint, thereby a total of 8 bytes for each of the 5 logical blocks. Suppose that two file data A and B are stored in the storage device. The file data A may be stored at logical block 0, logical block 2, and logical block 4. The file data B may be stored at logical block 1 and logical block 3. In one example embodiment, the next block hint that the file data A is stored in the logical block 0 is the physical block 8 and the next block hint that the file data A is stored on the logical block 2 is the physical block 16.

Figure 4:
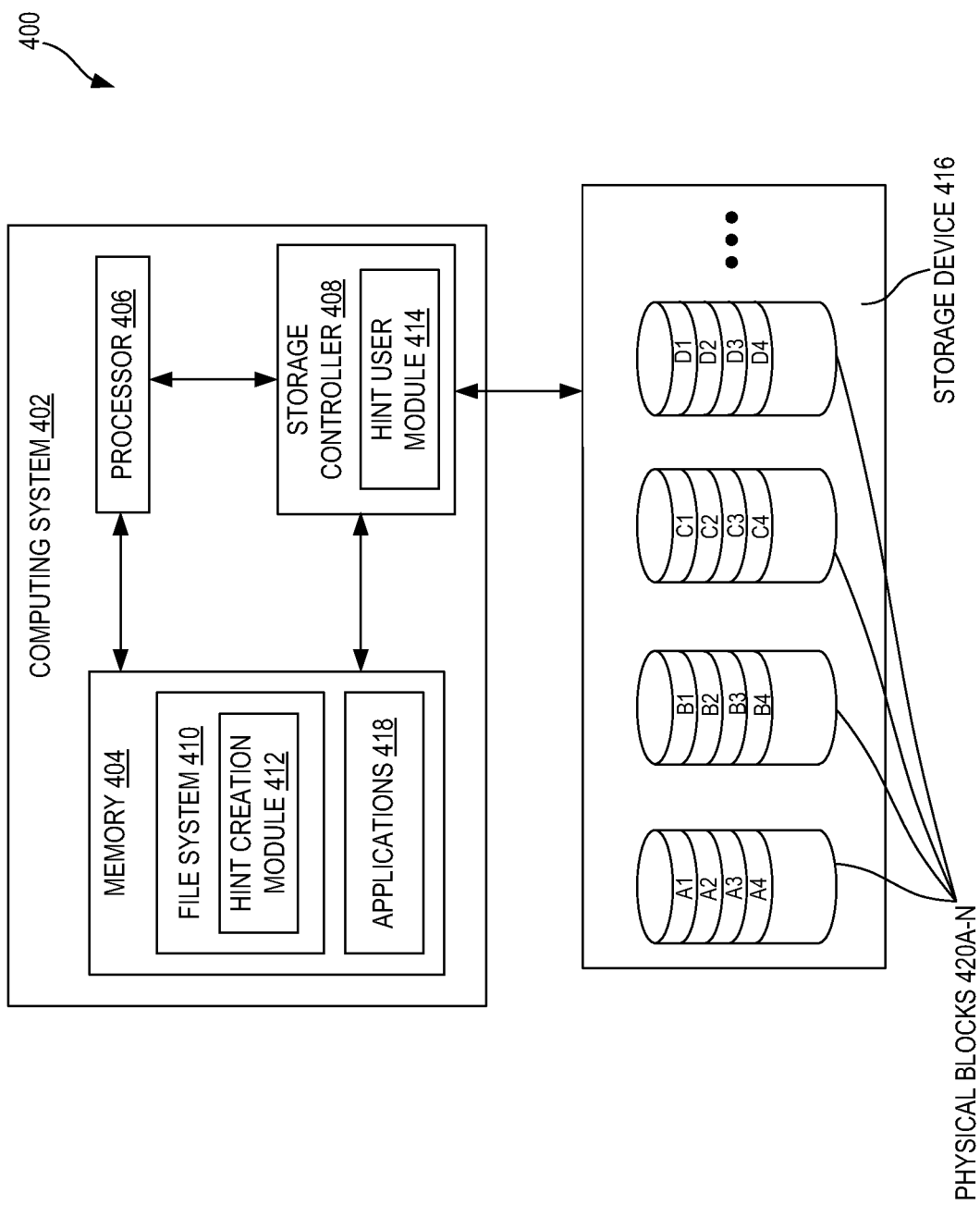
FIG. 4 illustrates an exemplary DIF enabled storage system for implementing embodiments of the present subject matter.

FIG. 4 illustrates an exemplary DIF enabled storage system 400 for implementing embodiments of the present subject matter. As shown, the DIF enabled storage system 400 includes a computing system 402 and a storage device 416. The computing system 402 includes a processor 406 and memory 404 operatively coupled to the processor 406. The memory 404 includes a file system 410 and one or more applications 418. The computing system 402 also includes a storage controller 408 operatively coupled to the memory 404 and the processor 406. Further as shown, the file system 410 includes a hint creation module 412 and the storage controller 408 includes a hint user module 414.

According to an embodiment of the present subject matter, the hint creation module 412 and the hint user module 414 enables cache management in the DIF enabled storage system 400. The hint user module 414 determines the file data required by the application 418 running on the processor 406 and generates the file access data. Then, the hint user module 414 determines the physical file mapping information related to the file access data on the storage device and generates read commands from the storage controller 408 to read-ahead file data stored in the storage device 416 using the physical file mapping information. Further, the hint user module 414 locates a next logical block including the portion of the file data stored using the next block hint. The portion of the file data is cached in the storage controller 408 by the hint user module 414.

The hint creation module 412 of the file system 410 formats the storage device 416 such that each logical block includes one or more physical blocks 420A-N. Then, the file data is stored in the logical blocks including the one or more physical blocks 420A-N along with the next block hint for each subsequent logical block.

For example, the hint creation module 412 and the hint user module 414 may be stored in the form of instructions in the file system 410 and the storage controller 408 respectively, that when executed by the computing system 402, causes the computing system 402 to perform the cache management as described in FIGS. 1 through 3. In another embodiment, the hint creation module 412 and the hint user module 414 may be stored in the form of instructions on a non-transitory computer readable storage medium that when executed by the computing system 402 causes the computing system 402 to perform cache management as described in FIGS. 1 through 3.

In various embodiments, the methods and systems described in FIGS. 1 through 4 enable caching of file data based on next block hints stored in the application tag of the logical blocks. The probability of cache hits is increased since the next block hints enable locating file data which has a higher probability of being read by an application (e.g., in a sequential file read operation). This may increase the performance of the storage system. The above-described methods and systems eliminate the need for the file system to completely traverse through file metadata. Only parsing through the application tag is needed to identify a first logical block. Thereafter each read logical block includes the next block hint from which a next logical block of the file data can be identified. The above-described methods and systems also enable an application to open file data in raw mode and read whole file data parsing through next block hint when the application tag is extended to the application.

Although the present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for caching file data stored in a storage device, wherein the file data is used by an application running on a computing system having a processor, a file system residing in memory, and a storage controller, comprising:
    determining file data required by the application running on the processor and generating file access data;
    determining physical file mapping information related to the file access data on the storage device, wherein the physical file mapping information including logical block information, associated physical block information and next block hints needed for caching portions of the file data for each subsequent logical block, wherein a next block hint stored in a current logical block comprises physical address of a next logical block; and
    generating read commands from the storage controller to read-ahead file data stored in the storage device using the logical block information, associated physical block information and the next block hints needed for caching portions of the file data for each subsequent logical block, wherein the next block hint stored in the current logical block is read while reading the file data from the current logical block.

2. The method of claim 1, further comprising:
    locating the next logical block including the portion of the file data stored using the next block hint;
    caching the portion of the file data in the storage controller; and
    repeating the above steps of locating, and caching until a threshold associated with the storage controller is reached.

3. The method of claim 1, further comprising:
formatting the storage device into logical blocks such that each logical block includes one or more physical blocks by the file system and wherein each physical block includes multiple bytes for storing the next block hints; and storing the file data in the logical blocks of the formatted storage device along with the next block hints for each subsequent logical block by the file system, wherein upon storing the file data in the next logical block, the next block hint comprising the physical address of the next logical block is stored in the current logical block.

4. The method of claim 1, wherein the storage controller is a small computer system interface (SCSI) controller, or a serial attached SCSI (SAS) controller.

5. The method of claim 4, wherein the read commands are SCSI read commands or SAS read commands.

6. The method of claim 1, wherein the storage controller and the storage device are data integrity field (DIF) enabled storage controller and DIF enabled storage device, respectively.

7. The method of claim 1, wherein the next block hint is stored in an application tag of a DIF associated with the current logical block.

8. A non-transitory computer-readable storage medium for caching file data stored in a storage device having instructions that, when executed by a computing system having a processor, a file system residing in memory, and a storage controller, cause the computing system to perform a method comprising:
determining file data required by an application running on the processor and generating file access data;

determining physical file mapping information related to the file access data on the storage device, wherein the physical file mapping information including logical block information, associated physical block information and next block hints needed for caching portions of the file data for each subsequent logical block, wherein a next block hint stored in a current logical block comprises physical address of a next logical block; and generating read commands from the storage controller to read-ahead file data stored in the storage device using the logical block information, associated physical block information and the next block hint needed for caching portions of the file data for each subsequent logical block, wherein the next block hint stored in the current logical block is read while reading the file data from the current logical block.

9. The non-transitory computer-readable storage medium of claim 8, further comprising:
locating the next logical block including the portion of the file data stored using the next block hint;
caching the portion of the file data in the storage controller; and
repeating the above steps of locating, and caching until a threshold associated with the storage controller is reached.

10. The non-transitory computer-readable storage medium of claim 8, further comprising:
formatting the storage device into logical blocks such that each logical block includes one or more physical blocks by the file system and wherein each physical block includes multiple bytes for storing the next block hints; and storing the file data in the logical blocks of the formatted storage device along with the next block hints for each subsequent logical block by the file system, wherein upon storing the file data in the next logical block, the next block hint comprising the physical address of the next logical block is stored in the current logical block.

11. The non-transitory computer-readable storage medium of claim 8, wherein the storage controller is a SCSI controller or a SAS controller.

12. The non-transitory computer-readable storage medium of claim 11, wherein the read commands are SCSI read commands or SAS read commands.

13. The non-transitory computer-readable storage medium of claim 8, wherein the storage controller and the storage device are DIF enabled storage controller and DIF enabled storage device, respectively.

14. A DIF enabled storage system comprising:
a computing system, comprising:
a processor;
memory operatively coupled to the processor and wherein the memory includes a file system and one or more applications;
a storage controller operatively coupled to the processor and the memory; and
a storage device operatively coupled to the storage controller, wherein the storage controller includes a hint user module having instructions capable of determining file data required by an application running on the processor and generating file access data, determining physical file mapping information related to the file access data on the storage device, wherein the physical file mapping information including logical block information, associated physical block information and next block hints needed for caching portions of the file data for each subsequent logical block, and generating read commands from the storage controller to read-ahead file data stored in the storage device using the logical block information, associated physical block information and the next block hint needed for caching portions of the file data for each subsequent logical block, wherein a next block hint stored in a current logical block comprises physical address of a next logical block, and wherein the storage controller reads the next block hint stored in the current logical block while reading the file data from the current logical block.

15. The DIF enabled storage system of claim 14, further comprising the hint user module having instructions capable of:
locating the next logical block including the portion of the file data stored using the next block hint;
caching the portion of the file data in the storage controller; and
repeating the above steps of locating, and caching until a threshold associated with the storage controller is reached.

16. The DIF enabled storage system of claim 14, wherein the storage controller is a SCSI controller or a SAS controller.

17. The DIF enabled storage system of claim 16, wherein the read commands are SCSI read commands or SAS read commands.

18. The DIF enabled storage system of claim 14, wherein the storage controller and the storage device are DIF enabled storage controller and DIF enabled storage device, respectively.

19. The DIF enabled storage system of claim 14, wherein the next block hint is stored in an application tag of a DIF associated with the current logical block.

20. The DIF enabled storage system of claim 14, wherein the file system includes a hint creation module having instructions capable of:

formatting the storage device into logical blocks such that each logical block includes one or more physical blocks and wherein each physical block includes multiple bytes for storing the next block hints; and storing the file data in the logical blocks of the formatted storage device along with the next block hints for each subsequent logical block, wherein upon storing the file data in the next logical block, the next block hint comprising the physical address of the next logical block is stored in the current logical block.

\* \* \* \* \*